No. 813,151. PATENTED FEB. 20, 1906.
T. JAMES.
DRILL CHUCK.
APPLICATION FILED NOV. 10, 1904.

WITNESSES

INVENTOR
Thomas James

UNITED STATES PATENT OFFICE.

THOMAS JAMES, OF BRADDOCK, PENNSYLVANIA.

DRILL-CHUCK.

No. 813,151.  Specification of Letters Patent.  Patented Feb. 20, 1906.

Application filed November 10, 1904. Serial No. 232,200.

*To all whom it may concern:*

Be it known that I, THOMAS JAMES, of Braddock, Allegheny county Pennsylvania, have invented a new and useful Drill-Chuck, of which the following is a full, clear, and exact description, reference being had to the accompanying drawings, forming part of this specification, in which—

Figure 1:
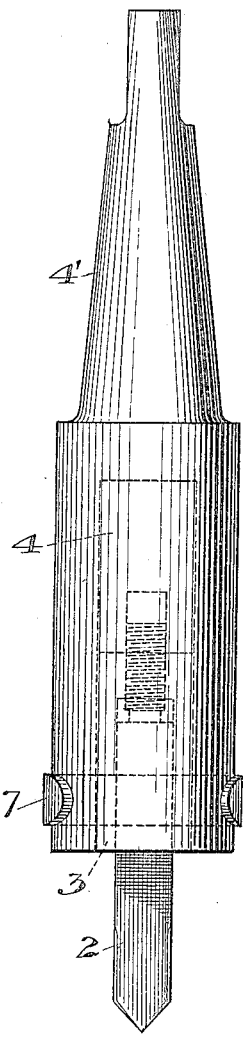
Figure 3:
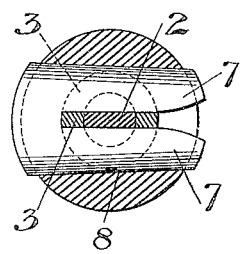
Figure 4:
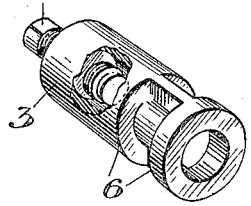
Figure 2:
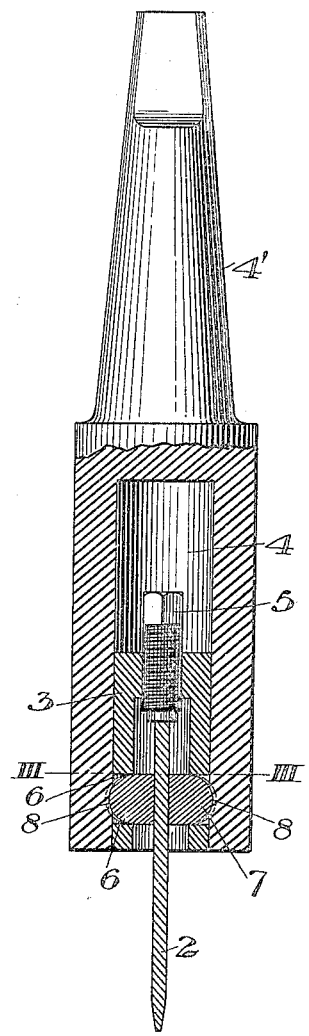
Figure 5:
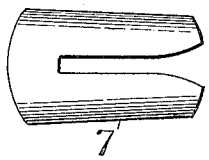

Figure 1 is a side elevation, and Fig. 2 is an elevation partly in section, of my improved drill-chuck, showing the parts assembled in place to hold the drill. Fig. 3 is a sectional end view on the line III III of Fig. 2. Fig. 4 is a perspective view of the removable bushing, showing the shoulders by which endwise motion of the bushing in the socket of the chuck is prevented and also showing the adjusting set-screw in the inner end of the bushing. Fig. 5 is a detail view of the forked tightening-wedge, having a central slot and tapered outer edges.

My invention relates to the construction of drill-chucks for drills, having straight shanks, and particularly to flat drills of varying sizes and lengths.

The purpose of my invention is to provide a drill-chuck by which in a simple and effective manner drills with straight shanks, and especially flat double-bitted drills, can be inserted, held, and removed without the use of screw-bolts or other easily-damaged screw-thread-tightening devices and the use of wrenches avoided.

Another object of my invention is to provide a chuck in which flat drills of varying sizes and lengths may be used and to provide means for adjusting the distance such drills project through the face of the chuck.

In the drawings, 2 represents a double-bitted flat drill which is inserted in a removable bushing 3, located in the socket of the drill-chuck 4. On the inner end of the bushing 3 is an adjustable set-screw 5, against which set-screw the inner end of the drill rests when in place and by which inward movement of the drill in the chuck is regulated and the drill is held during the drilling operation.

On the one end of the chuck is the usual taper shank 4', which fits the ordinary taper socket in drill-press spindles.

Instead of forming the chuck with a taper shank 4' the chuck may be formed integral with the spindle of the drill-press.

The end of the bushing 3 is cut away, so as to form shoulders 6 6, the portions connecting the shoulders 6 6 together always being slightly less in thickness than the drill used in the bushing. The bushing is held in place and prevented from moving in the socket by means of a forked wedge 7, having its outer sides tapered, which fits into a similarly-tapered transverse slot 8, located in the end of the drill-chuck. The drill fits between the arms on the forked wedge, and by driving the wedge tightly into the tapered slot the arms of the wedge are sprung inwardly and grip the sides of the drill and in this way prevent its removal from the bushing until the wedge has been loosened in its slot.

In the operation of my improved chuck the set-screw in the end of the bushing is first adjusted to suit the length of drill to be used. The bushing is then inserted in place in the socket and the forked wedge is loosely inserted in its slot. The drill is then placed in the bushing and the wedge tightly driven into the slot. The wedging action of the forked wedge against the tapered sides of the slot spring the arms of the forked wedge and bind the drill between them. In this way the drill and bushing are both securely held in place in the chuck.

The use of nuts and bolts or other screw-tightening devices which are easily injured and destroyed is avoided. No wrenches are required to tighten the gripping parts to hold the drill in place in the chuck, all that is required to tighten and loosen the chuck being a blow from a hammer on the tightening-wedge.

By the use of the removable bushing in the chuck very short drills can be used, and the removable bushing also permits the use of drills of varying sizes in the same chuck.

By locating the adjusting-screw in the removable bushing I am enabled to regulate the distance the drill will project through the drill-chuck before the drill and bushing is placed in the machine. In this way the loss of time in the drilling operation which would be required to adjust the drill in its socket is avoided. This is of importance, especially with multiple-spindle drill-presses, where the drills all project the same distance through the chucks.

Variations in the construction and arrangement of the parts forming the chuck may be made without departing from my invention, since

What I claim is—

1. A drill-chuck, comprising a socket, a removable bushing in the socket, and means in the bushing for adjusting the drill; substantially as described.

2. A drill-chuck comprising a socket, a removable bushing having oppositely-facing shoulders in said socket, means in the bushing for adjusting the drill, a transverse slot in the socket, and means extending through the slot and on both sides of the drill for holding the drill and bushing in the socket; substantially as described.

3. A drill-chuck comprising a socket, a removable bushing having oppositely-facing shoulders, in the socket, a transverse slot in the socket and means extending through the slot and on both sides of the drill for holding the drill and bushing in the socket; substantially as described.

4. A drill-chuck comprising a socket, a removable bushing having oppositely-facing shoulders in the socket, a transverse slot in the socket and a forked wedge extending through the slot and on both sides of the drill for holding the drill and bushing in the socket; substantially as described.

In testimony whereof I have hereunto set my hand.

THOMAS JAMES.

Witnesses:
CHAS. E. DINKEY,
JNO. F. LEWIS.